US011228950B2

(12) United States Patent
Shen

(10) Patent No.: US 11,228,950 B2
(45) Date of Patent: Jan. 18, 2022

(54) SERVICE REDIRECTION METHOD AND APPARATUS

(71) Applicant: HUAWEI TECHNOLOGIES CO., LTD., Shenzhen (CN)

(72) Inventor: Zhimin Shen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 16/817,023

(22) Filed: Mar. 12, 2020

(65) Prior Publication Data

US 2020/0213914 A1  Jul. 2, 2020

Related U.S. Application Data

(63) Continuation of application No. PCT/CN2018/104327, filed on Sep. 6, 2018.

(51) Int. Cl.
*H04W 36/00* (2009.01)
*H04L 12/727* (2013.01)
*H04W 12/06* (2021.01)
*H04W 80/04* (2009.01)
*H04W 80/10* (2009.01)

(52) U.S. Cl.
CPC ....... *H04W 36/0022* (2013.01); *H04W 12/06* (2013.01); *H04W 80/04* (2013.01); *H04W 80/10* (2013.01)

(58) Field of Classification Search
CPC . H04W 36/0022; H04W 12/06; H04W 80/04; H04W 80/10; H04W 28/06; H04W 28/08; H04L 45/121
See application file for complete search history.

(56) References Cited

U.S. PATENT DOCUMENTS

2013/0254258 A1  9/2013 Agarwalla et al.
2018/0192390 A1* 7/2018 Li ........................ H04W 8/065

FOREIGN PATENT DOCUMENTS

| CN | 104283951 A | 1/2015 |
| CN | 106358245 A | 1/2017 |
| CN | 106604328 A | 4/2017 |

(Continued)

OTHER PUBLICATIONS

XP014299547 Draft ETSI GR MEC 018 V1.0.1 (Sep. 2017),Mobile Edge Computing (MEC);End to End Mobility Aspects,total 54 pages.

(Continued)

*Primary Examiner* — Joseph E Dean, Jr.
(74) *Attorney, Agent, or Firm* — Stein IP, LLC

(57) ABSTRACT

A redirection method and apparatus in which a first network device receives a service request from a terminal device, where the request is used to request a service related to a first edge APP; and when the first edge APP is unavailable and a second edge APP is available, redirects the service request to the second edge APP, where the first edge APP and the second APP respectively correspond to a first DNAI and a second DNAI. The first DNAI represents a deployment location of the first edge APP, the second DNAI represents a deployment location of the second edge APP, the deployment locations represented by the first DNAI and the second DNAI meet a preset condition, and the second edge APP is in edge APPs corresponding to the second DNAI, and has a sane service provider and function as the first edge APP.

19 Claims, 9 Drawing Sheets

(56) References Cited

FOREIGN PATENT DOCUMENTS

WO      2017100640  A1      6/2017
WO      2017128702  A1      8/2017

OTHER PUBLICATIONS

XP051325627 S2-175779 Huawei, HiSilicon,"TS 23.501: AF influenced PDU session establishment and DN authentication/authorization via NEF",3GPP TSG SA WG2 Meeting #122bis,Aug. 21-Aug. 25, 2017, Sophia Antipolis, France,total 6 pages.
3GPP TS 23.501 V1.3.0 (Sep. 2017),3rd Generation Partnership Project;Technical Specification Group Services and System Aspects; System Architecture for the 5G System; Stage 2 (Release 15),total 174 pages.
S6-170700 Huawei et al.,"Annexure ETSI MEC analysis",3GPP TSG-SA WG6 Meeting #17,Prague, Czech Republic, May 8-12, 2017,total 6 pages.
S2-161640 Huawei et al.,"Solution to Key Issue on Policy Framework",SA WG2 Meeting #114,Apr. 11 -15, 2016, Sophia Antipolis, FR,total 3 pages.

* cited by examiner

SERVICE REDIRECTION METHOD AND APPARATUS

CROSS-REFERENCE TO RELATED APPLICATIONS

This application is a continuation of International Patent Application No. PCT/CN2018/104327, filed on Sep. 6, 2018, which claims priority to Chinese Patent Application No. 201710860147.1, filed on Sep. 21, 2017, the disclosures of the aforementioned applications are hereby incorporated by reference in their entireties.

TECHNICAL FIELD

Aspects of this application relate to the field of communications technologies, and in particular, to a service redirection method and apparatus.

BACKGROUND

Mobile edge computing (MEC) provides an internet technology (IT) service environment and a cloud computing capability in an access network (AN) closest to a terminal device of a user, to further reduce a latency, improve network operation efficiency, improve a service transmission capability, and optimize user experience.

For an existing typical MEC architecture, refer to FIG. 1. An edge application (application, APP) may be deployed near an edge user plane function (UPF). When the edge APP is normal, the edge UPF distributes, to the edge APP, a service request sent by a terminal device through the AN. When the edge APP is abnormal, the edge UPF distributes, to a center APP, the service request sent by the terminal device through the AN. The center APP may be deployed in a data network (DN). It can be learned that as data traffic of a user increases, pressure on the center APP is greatly increased when the edge APP is abnormal,

SUMMARY

In embodiments of this application, a service redirection method and apparatus is provided, to reduce pressure on a center APP.

To achieve the foregoing and/or other objectives, the embodiments of this application provide the following technical solutions.

According to a first aspect, a service redirection method is provided. The method includes: receiving, by a first network device, a service request from a terminal device, where the service request is used to request a service related to a first edge application APP; and when the first edge APP is unavailable and a second edge APP is available, redirecting, by the first network device, the service request to the second edge APP, where the first edge APP corresponds to a first DNAI (data network access identifier), the second edge APP corresponds to a second DNAI, the first DNAI can represent a deployment location of the first edge APP, the second DNAI can represent a deployment location of the second edge APP, the deployment locations represented by the first DNAI and the second DNAI meet a preset condition, and the second edge APP is in edge APPs corresponding to the second DNAI, and has a same service provider and a same function as the first edge APP. According to the method provided in the first aspect, when the first edge APP is unavailable and the second edge APP is available, when receiving the service request for the service related to the first edge APP, the first network device redirects the service request to the second edge APP. Because the second edge APP and the first edge APP have the same service provider and the same function, the center APP does not need to process the service related to the first edge APP, so that pressure on the center APP can be reduced.

In a possible design, the first DNAI and the second DNAI belong to a same resource group, and base stations covered by access UPFs corresponding to any two DNAIs in the resource group are neighboring base stations; tracking area identities covered by access UPFs corresponding to any two DNAIs in the resource group are the same or adjacent; or a packet transmission distance between DCs corresponding to any two DNAIs in the resource group is less than or equal to a preset threshold. In this possible implementation, DNAIs that represent relatively close deployment locations can form the resource group, so that a determined second edge APP can quickly process the service request sent by the terminal device and provide a corresponding service.

In a possible design, before the redirecting, by the first network device, the service request to the second edge APP, the method further includes: sending, by the first network device, instruction information to a second network device, where the instruction information is used to instruct the second network device to establish a path between a first edge UPF corresponding to the first edge APP and a second edge UPF corresponding to the second edge APP. In this possible implementation, the path may be established between the edge UPFs corresponding to the first edge APP and the second edge APP, so that a service packet sent by the terminal device arrives at the second edge APP or a service packet sent by the second edge APP arrives at the terminal device.

In a possible design, after the sending, by the first network device, instruction information to a second network device, the method further includes: receiving, by the first network device, path update complete information from the second network device, where the path update complete information is used to indicate that the path between the first edge UPF and the second edge UPF is established.

In a possible design, before the sending, by the first network device, instruction information to a second network device, the method further includes: sending, by the first network device, a location request to a third network device, so that the third network device obtains an edge UPF accessed by the terminal device and further obtains a target resource group, where the target resource group is a resource group including the first DNAI; receiving, by the first network device, all or some parameters in the target resource group from the third network device; determining, by the first network device, the second DNAI based on the all or some parameters in the target resource group; and determining, by the first network device, the second edge APP based on the second DNAI.

In a possible design, before the redirecting, by the first network device, the service request to the second edge APP, the method further includes: determining, by the first network device, that the first edge APP is unavailable.

According to a second aspect, a service redirection method is provided. The method includes: receiving, by a second network device, instruction information from a first network device; and establishing, by the second network device according to the instruction information, a path between a first edge UPF corresponding to a first edge APP and a second edge UPF corresponding to a second edge APP, where the second edge APP is a serving edge APP to which the first network device redirects a service request of the terminal device when the first edge APP is unavailable, the service request is used to request a service related to the first edge APP, the first edge APP corresponds to a first DNAI, the second edge APP corresponds to a second DNAI, the first DNAI can represent a deployment location of the first edge APP, the second DNAI can represent a deployment location of the second edge APP, the deployment locations represented by the first DNAI and the second DNAI meet a preset condition, and the second edge APP is in edge APPs corresponding to the second DNAI, and has a same service provider and a same function as the first edge APP. According to the method provided in the second aspect, the path may be established between the edge UPFs corresponding to the first edge APP and the second edge APP, so that a service packet sent by the terminal device arrives at the second edge APP or a service packet sent by the second edge APP arrives at the terminal device.

In a possible design, the first DNAI and the second DNAI belong to a same resource group, and base stations covered by access UPFs corresponding to any two DNAIs in the resource group are neighboring base stations; tracking area identities covered by access UPFs corresponding to any two DNAIs in the resource group are the same or adjacent; or a packet transmission distance between DCs corresponding to any two DNAIs in the resource group is less than or equal to a preset threshold. In this possible implementation, DNAIs that represent relatively close deployment locations can form the resource group, so that a determined second edge APP can quickly process the service request sent by the terminal device and provide a corresponding service.

In a possible design, the service request is a service request for a first service, and the establishing, by the second network device according to the instruction information, a path between a first edge UPF corresponding to a first edge APP and a second edge UPF corresponding to a second edge APP includes: sending, by the second network device, a first distribution rule to the first edge UPF, where the first distribution rule is: sending, to the terminal device, a service packet that is of the first service of the terminal device and that is received from the second edge UPF, and sending, to the second edge UPF, the service packet that is of the first service and that is received from the terminal device; and sending, by the second network device, a second distribution rule to the second edge UPF, where the second distribution rule is: sending, to the second edge APP, the service packet that is of the first service of the terminal device and that is received from the first edge UPF, and sending, to the first edge UPF, the service packet that is of the first service of the terminal device and that is received from the second edge APP. In this possible implementation, the service packet sent by the terminal device may arrive at the second edge APP, or a service packet sent by the second edge APP may arrive at the terminal device.

In a possible design, after the establishing, by the second network device according to the instruction information, a path between a first edge UPF corresponding to a first edge APP and a second edge UPF corresponding to a second edge APP, the method further includes: sending, by the second network device, path update complete information to the first network device, where the path update complete information is used to indicate that the path between the first edge UPF and the second edge UPF is established.

In a possible design, the method further includes: receiving, by the second network device, a location request from a third network device, where the location request is used to request an edge UPF accessed by the terminal device; and sending, by the second network device, a target edge UPF to the third network device, where the target edge UPF is accessed by the terminal device.

According to a third aspect, a service redirection method is provided. The method includes: receiving, by a third network device, a target edge UPF from a second network device, where the target edge UPF is accessed by a terminal device; obtaining, by the third network device, a target resource group based on the target edge UPF, where the target resource group includes a first DNAI, and the first DNAI can represent a deployment location of a first edge application APP; and sending, by the third network device, all or some parameters in the target resource group to a first network device, so that the first network device determines a second edge APP, where the second edge APP is a serving edge APP to which the first network device redirects a service request of the terminal device when the first edge APP is unavailable, the service request is used to request a service related to the first edge APP, the first edge APP corresponds to the first DNAI, the second edge APP corresponds to a second DNAI, the second DNAI can represent a deployment location of the second edge APP, the deployment locations represented by the first DNAI and the second DNAI meet a preset condition, and the second edge APP is in edge APPs corresponding to the second DNAI, and has a same service provider and a same function as the first edge APP. According to the method provided in the third aspect, the third network device may obtain the target resource group, and send all or some parameters in the target resource group to the first network device, so that the first network device determines the second edge APP.

In a possible design, the first DNAI and the second DNAI belong to a same resource group, and base stations covered by access UPFs corresponding to any two DNAIs in the resource group are neighboring base stations; tracking area identities covered by access UPFs corresponding to any two DNAIs in the resource group are the same or adjacent; or a packet transmission distance between DCs corresponding to any two DNAIs in the resource group is less than or equal to a preset threshold. In this possible implementation, DNAIs that represent relatively close deployment locations can form the resource group, so that a determined second edge APP can quickly process the service request sent by the terminal device and provide a corresponding service.

In a possible design, before the receiving, by a third network device, a target edge UPF from a second network device, the method further includes: receiving, by the third network device, a location request from the first network device, where the location request is used to request an edge UPF accessed by the terminal device; sending, by the third network device, the location request to the second network device; and receiving, by the third network device, the target edge UPF from the second network device.

In a possible design, the method further includes: determining, by the third network device, that the first edge APP is unavailable.

In a possible design, the method further includes: receiving, by the third network device, at least one resource group from a mobile edge platform (MEP) manager.

According to a fourth aspect, a service redirection apparatus is provided. The apparatus has a function of implementing any method provided in the first aspect. The function may be implemented by hardware, or may be implemented by hardware executing corresponding software. The hardware or the software includes one or more units corresponding to the functions.

According to a fifth aspect, a service redirection apparatus is provided. The apparatus has a function of implementing any method provided in the second aspect. The function may be implemented by hardware, or may be implemented by hardware executing corresponding software. The hardware or the software includes one or more units corresponding to the functions.

According to a sixth aspect, a service redirection apparatus is provided. The apparatus has a function of implementing any method provided in the third aspect. The function may be implemented by hardware, or may be implemented by hardware executing corresponding software. The hardware or the software includes one or more units corresponding to the functions.

According to a seventh aspect, a service redirection apparatus is provided. The apparatus includes a memory and a processor. The memory is configured to store a computer executable instruction, and the processor executes the computer executable instruction stored in the memory, so that the apparatus implements any method provided in the first aspect. The apparatus may exist in a product form of a chip.

According to an eighth aspect, a service redirection apparatus is provided. The apparatus includes a memory and a processor. The memory is configured to store a computer executable instruction, and the processor executes the computer executable instruction stored in the memory, so that the apparatus implements any method provided in the second aspect. The apparatus may exist in a product form of a chip.

According to a ninth aspect, a service redirection apparatus is provided. The apparatus includes a memory and a processor. The memory is configured to store a computer executable instruction, and the processor executes the computer executable instruction stored in the memory, so that the apparatus implements any method provided in the third aspect. The apparatus may exist in a product form of a chip.

According to a tenth aspect, in an embodiment of this application, a computer readable storage medium is provided. When the computer readable storage medium is run on a computer, the computer is enabled to perform any method provided in the first aspect.

According to an eleventh aspect, in an embodiment of this application, a computer readable storage medium is provided. When the computer readable storage medium is run on a computer, the computer is enabled to perform any method provided in the second aspect.

According to a twelfth aspect, in an embodiment of this application, a computer readable storage medium is provided. When the computer readable storage medium is run on a computer, the computer is enabled to perform any method provided in the third aspect.

According to a thirteenth aspect, in an embodiment of this application, a computer program product including an instruction is provided. When the computer program product is run on a computer, the computer is enabled to perform any method provided in the first aspect.

According to a fourteenth aspect, in an embodiment of this application, a computer program product including an instruction is provided. When the computer program product is run on a computer, the computer is enabled to perform any method provided in the second aspect.

According to a fifteenth aspect, in an embodiment of this application, a computer program product including an instruction is provided. When the computer program product is run on a computer, the computer is enabled to perform any method provided in the third aspect.

For technical effects brought by any design in the fourth aspect to the fifteenth aspect, refer to technical effects brought by different designs in the first aspect to the third aspect. Details are not described herein again.

DESCRIPTION OF EMBODIMENTS

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

Figure 1:
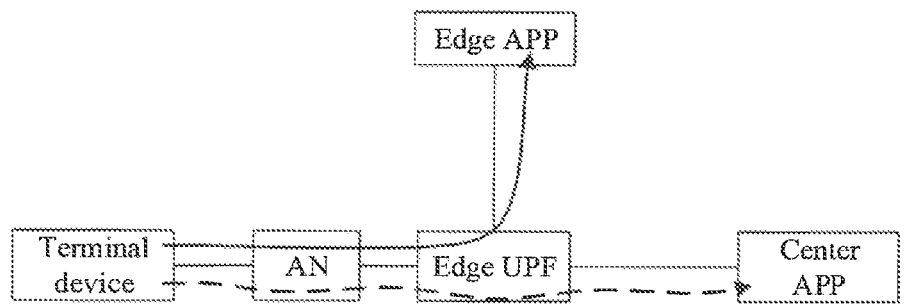
FIG. 1 is a schematic diagram of performing service distribution by an edge UPF in the prior art.
Figure 2:
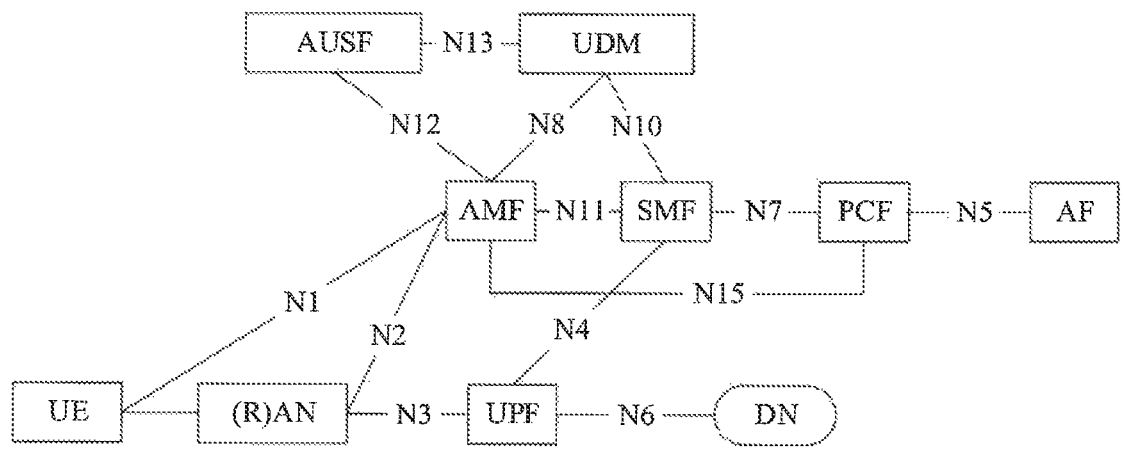
FIG. 2 is a schematic diagram of a composition architecture of a 5G network according to an embodiment of this application.

Specifically, a method provided in the embodiments of this application may be applied to a 5G network shown in FIG. 2. As shown in FIG. 2, the 5G network may include the following plurality of network function (NF) entities: an authentication server function (AUSF) network element, an access and mobility management function (AMF) network element, a DN, a unified data management (UDM) network element, a policy control function (PCF) network element, a (radio) access network ((R)AN) device, a UPF network element, a terminal device (FIG. 2 is drawn by using an example in which the terminal device is user equipment (user equipment, UE), an application function (AF) network element, and a session management function (SMF) network element. It may be understood that FIG. 2 is merely an example architectural diagram. In addition to the network elements shown in FIG. 2, the 5G network architecture may further include another network element. For example, a network exposure function (NEF) network element may be further included between the AF network element and the PCF network element. The NEF network element is capable of opening some service capabilities of an operator network to a third party. For example, an operator may sense a base station or a location of a user, and provide the information to an over the top (OTT) application based on a policy.

A control plane (CP) function network element includes: a UDM network element, an AUSF network element, a PCF network element, an AMF network element, and an SMF network element.

Specifically, main functions of the (R)AN device include: providing a wireless connection. Main functions of the UPF network element include: routing and forwarding a data packet, a mobility anchor, and an uplink classifier to support a service flow in routing to a DN to support a multi-homing protocol data unit (PDU) session, and the like. The DN may be an operator service, an interact access service, or a third-party service. Main functions of the AMP network element include: user registration management, accessibility detection, SMF node selection, mobile state conversion management, and the like. Main functions of the SMF network element include: controlling establishment, modification, and deletion of a session, user-plane node selection, and the like. Main functions of the PCF network element include: a policy decision point, providing rules such as a rule based on a service data stream and application detection, a gating rule, a quality of service (QoS) rule, and a flow-based charging control rule. Main functions of the AF network element include: interacting with a 3rd generation partnership project (3GPP) core network to provide a service, so as to affect service flow routing, access network capability exposure, policy control, and the like. Main functions of the AUSF network element include providing an authentication service. Main functions of the UDM network element include storing user subscription data.

The UE communicates with the AMF network element by using a next generation (Next generation) interface 1 (N1), the (R)AN device communicates with the AMF network element by using an N interface 2 (N2). The (R)AN device communicates with the UPF network element by using an N interface 3 (N3). The UPF network element communicates with the DN by using an N interface 6 (N6). The AMF network element communicates with the SMF network element by using an N interface 11 (N11). The AMF network element communicates with the UDM network element by using an N interface 8 (N8). The AMF network element communicates with the AUSF network element by using an N interface 12 (N12). The AMF network element communicates with the PCF network element by using an N interface 15 (N15). The SMF network element communicates with the PCF network element by using an N interface 7 (N7). The SMF network element communicates with the UPF network element by using an N interface 4 (N4). The SMF network element communicates with the UDM network element by using an N interface 10 (N10). The UDM network element communicates with the AUSF network element by using an N interface 13 (N13). The PCF network element communicates with the AF network element by using an N interface 5 (N5).

Figure 3:
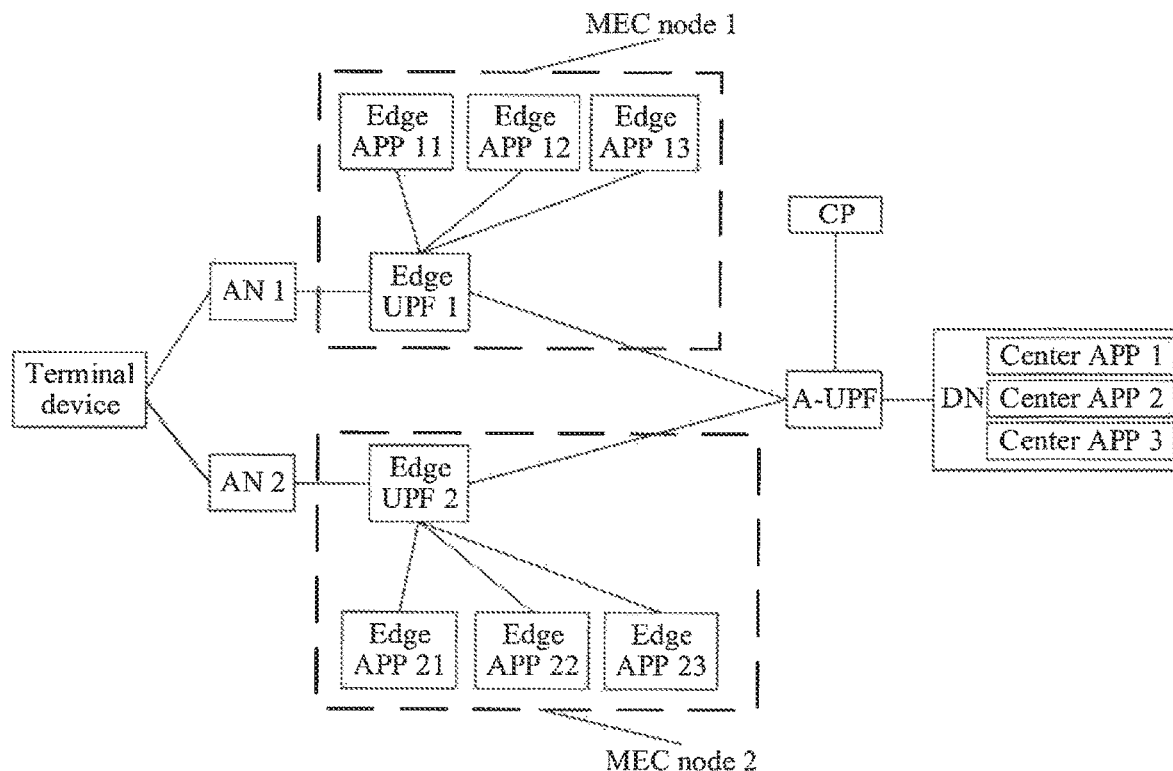
FIG. 3 is a schematic diagram of an application scenario according to an embodiment of this application.

For example, FIG. 3 is a schematic diagram of an application scenario of a method according to an embodiment of this application. An AN 1 is an access network in a deployment area 1, and a terminal device may access a network by using the AN 1 when the terminal device is located in the deployment area 1. An AN 2 is an access network in a deployment area 2, and the terminal device may access the network by using the AN 2 when the terminal device is located in the deployment area 2. An edge APP 11, an edge APP 12, and an edge APP 13 are deployed in the deployment area 1. An edge APP 21, an edge APP 22, and an edge APP 23 are deployed in the deployment area 2. The edge APP 11 and the edge APP 21 are applications that are of a company 1 and that have a same function. A center APP 1 is an APP that is deployed on a DN or of a non-edge company 1, and functions of the center APP 1 generally include functions of the edge APP 11 and the edge APP 21. The edge APP 12 and the edge APP 22 are applications that are of a company 2 and that have a same function. A center APP 2 is an APP that is deployed on a DN or of a non-edge company 2, and functions of the center APP 2 generally include functions of the edge APP 12 and the edge APP 22. The edge APP 13 and the edge APP 23 are applications that are of a company 3 and that have a same function. A center APP 3 is an APP that is deployed on a DN or of a non-edge company 3, and functions of the center APP 3 generally include functions of the edge APP 13 and the edge APP 23.

An edge UPF 1 may distribute, to the edge APP 11, the edge APP 12, the edge APP 13, or the center APP, a service request sent by the terminal device through the AN 1. An edge UPF 2 may distribute, to the edge APP 21, the edge APP 22, the edge APP 23, or the center APP, a service request sent by the terminal device through the AN 2, The edge UPF 1 and the edge UPF 2 may be connected to the DN by using an anchor-user plane function (anchor-user plane function, A-UPF), and the A-UPF may be connected to a CP.

The edge APP 11, the edge APP 12, the edge APP 13, and the edge UPF 1 are one MEC node (denoted as an MEC node 1). The edge APP 21, the edge APP 22, the edge APP 23, and the edge UPF 2 are another MEC node (denoted as a MEC node 2). The architecture shown in FIG. 3 is merely a schematic diagram of an example application scenario. Actually, there may be more MEC nodes in a network. A MEC node (including an edge UPF and an edge APP) deployed to a data center (data center, DC) and an AN list are associated with a data network access identifier (data network access identifier, DNAI). For example, the MEC node 1 is associated with a DNAI 1, and the MEC node 2 is associated with a DNAI 2. In this case, the AN 1 is an AN in an AN list associated with the DNAI 1, and the AN 2 is an AN in an AN list associated with the DNAI 2. A specific AN in the AN list to which the edge UPF is connected may be determined based on network planning.

For example, for a correspondence of a DNAI, an associated AN, an edge UPF, an edge APP, and a DC corresponding to a MEC node, refer to Table 1.

TABLE 1

| Deployment area | DNAI | DC | AN | Edge UPF | Edge APP |
| --- | --- | --- | --- | --- | --- |
| Deployment area 1 | DNAI 1 | DC 1 | AN 1 | Edge UPF 1 | Edge APP 11 (company 1) Edge APP 12 (company 2) Edge APP 13 (company 3) |
| Deployment area 2 | DNAI 2 | DC 2 | AN 2 | Edge UPF 2 | Edge APP 21 (company 1) Edge APP 22 (company 2) Edge APP 23 (company 3) |

Figure 4:
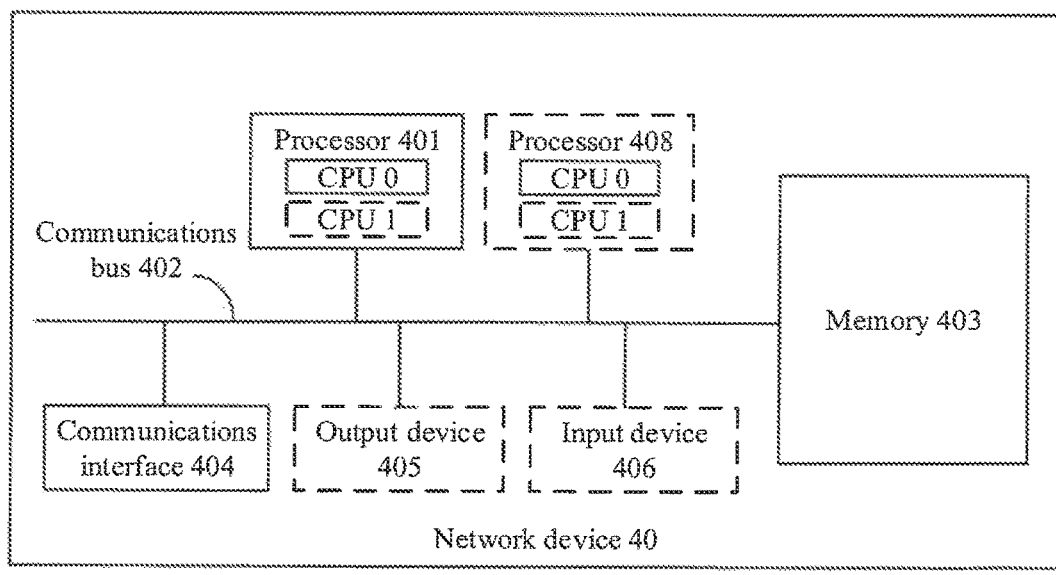
FIG. 4 is a schematic diagram of hardware composition of a network device according to an embodiment of this application.

FIG. 4 is a schematic diagram of a hardware structure of a network device 40 according to an embodiment of this application. The network device 40 includes at least one processor 401, a communications bus 402, a memory 403, and at least one communications interface 404. The network device 40 may be a first network device, a second network device, or a third network device in this application.

The processor 401 may be a general-purpose central processing unit (CPU), a microprocessor, an application-specific integrated circuit (ASIC), or one or more integrated circuits configured to control program execution of the solutions in this application.

The communications bus 402 may include a path used to transmit information between the foregoing components.

The communications interface 404 may be any apparatus such as a transceiver, and is configured to communicate with another device or a communications network, for example, an Ethernet, an AN, or a wireless local area network (WLAN).

The memory 403 may be a read-only memory (ROM) or another type of static storage device capable of storing static information and instructions, a random access memory (RAM) or another type of dynamic storage device capable of storing information and instructions, or may be an electrically erasable programmable read-only memory (EE-PROM), a compact disc read-only memory (CD-ROM) or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. Alternatively, the memory may be integrated with the processor.

The memory 403 is configured to store application program code for performing the solutions in this application, and the application program code is executed under control of the processor 401. The processor 401 is configured to execute the application program code stored in the memory 403, to implement the method described below.

In specific implementation, in an embodiment, the processor 401 may include one or more CPUs, for example, a CPU 0 and a CPU 1 in FIG. 4.

In specific implementation, in an embodiment, the network device 40 may include a plurality of processors, for example, the processor 401 and a processor 408 in FIG. 4. Each of the processors may be a single-core processor (single-CPU), or may be a multi-core processor (multi-CPU). Herein the processor may be one or more devices, circuits, and/or processing cores configured to process data (for example, a computer program instruction).

In specific implementation, in an embodiment, the network device 40 may further include an output device 405 and an input device 406.

Figure 5:
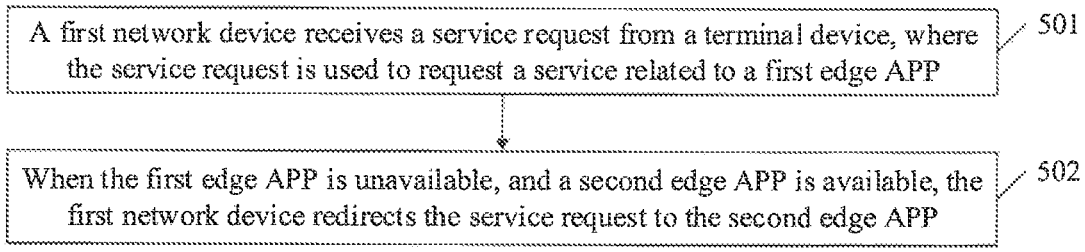
FIG. 5 is a flowchart of a service redirection method according to an embodiment of this application.

In an embodiment of this application, a service redirection method is provided. As shown in FIG. 5, the method includes the following steps.

501. A first network device receives a service request from a terminal device, where the service request is used to request a service related to a first edge APP.

The first network device may be a network device loaded with a first center APP. The first center APP and the first edge APP have a same service provider. The first center APP may have a function of the first edge APP, and the first network device may be a network device in a DN.

In this embodiment of this application, the method provided in this embodiment of this application is described by using an example in which the terminal device accesses a network through a first AN (referring to FIG. 7 below). The first AN is connected to a first edge UPF. It should be noted that when the first edge APP is available, the first edge UPF corresponding to the first edge APP distributes the service request sent by the terminal device through the first AN to the first edge APP. When the first edge APP is unavailable, the first edge UPF distributes the service request sent by the terminal device through the first AN to the first center APP.

502. When the first edge APP is unavailable, and a second edge APP is available, the first network device redirects the service request to the second edge APP.

The first edge APP corresponds to a first DNAI, and the second edge APP corresponds to a second DNAI. The first DNAI can represent a deployment location of the first edge APP, and the second DNAI can represent a deployment location of the second edge APP. The deployment locations represented by the first DNAI and the second DNAI meet a preset condition. The second edge APP is in edge APPs corresponding to the second DNAI, and has a same service provider and a same function as the first edge APP.

That an edge APP is unavailable may mean that the edge APP is faulty, load of the edge APP reaches a specific threshold (for example, system resource consumption of a server of the edge APP reaches a critical threshold, and a new computing service cannot be admitted), or another case in which the edge APP cannot process a service.

The first edge APP may be any edge APP, and the edge APPs corresponding to the second DNAI may be all or some edge APPs that are deployed in a deployment region and that correspond to the second DNAI.

Optionally, the first DNAI and the second DNAI belong to a same resource group, and base stations covered by access UPFs corresponding to any two DNAIs in the resource group are neighboring base stations; tracking area identities (TAI) covered by access UPFs corresponding to any two DNAIs in the resource group are the same or adjacent; or a packet transmission distance between DCs corresponding to any two DNAIs in the resource group is less than or equal to a preset threshold. A condition met by any two DNAIs in the resource group is the preset condition met by the deployment locations that are represented by the first DNAI and the second DNAI.

For example, based on the example shown in Table 1, if the second DNAI is a DNAI 2, the edge APPs corresponding to the second DNAI may include an edge APP 21, an edge APP 22, and an edge APP 23. In this case, if the DNAI 1 and the DNAI 2 are DNAIs in a resource group, and if the first edge APP is an edge APP 11, the second edge APP is the edge APP 21.

For example, the resource group may be determined in any one of the following manners.

Manner 1: DNAIs corresponding to access UPFs covering neighboring base stations form a resource group.

In specific implementation, the resource group may be constructed by using each DNAI as a reference point.

Figure 6:
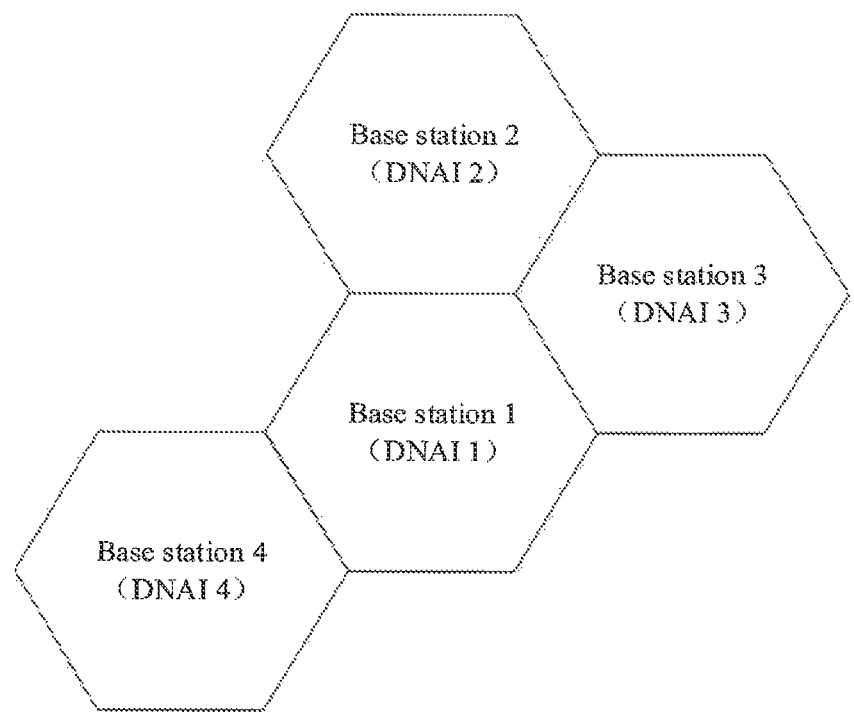
FIG. 6 is a schematic diagram of a neighboring base station according to an embodiment of this application.

For example, referring to FIG. 6, a base station i (i is an integer greater than 0 and less than or equal to 4) is a base station covered by a UPF corresponding to a DNAI i. A base station 1 is adjacent to a base station 2, a base station 3, and a base station 4. The base station 2 is adjacent to the base station 1 and the base station 3. The base station 3 is adjacent to the base station 1 and the base station 2. The base station 4 is adjacent to the base station 1. For a resource group constructed by using each DNAI as a reference point, refer to Table 2.

TABLE 2

| Resource group | Reference point | DNAI in the resource group |
|---|---|---|
| 1 | DNAI 1 | DNAI 1, DNAI 2, DNAI 3, and DNAI 4 |
| 2 | DNAI 2 | DNAI 2, DNAI 1, and DNAI 3 |

TABLE 2-continued

| Resource group | Reference point | DNAI in the resource group |
|---|---|---|
| 3 | DNAI 3 | DNAI 3, DNAI 1, and DNAI 2 |
| 4 | DNAI 4 | DNAI 4 and DNAI 1 |

Manner 2: DNAIs corresponding access UPFs covering same or adjacent TAIs foam a resource group.

For example, if there are five access UPFs, corresponding DNAIs are a DNAI 1, a DNAI 2, a DNAI 3, a DNAI 4, and a DNAI 5, and TAIs of the DNAI 1, the DNAI 2, and the DNAI 4 are the same, and TAIs of the DNAI 3 and the DNAI 5 are the same. For a resource group constructed based on the DNAIs, refer to Table 3.

TABLE 3

| Resource group | DNAIs in the resource group |
|---|---|
| 1 | DNAI 1, DNAI 2, and DNAI 4 |
| 2 | DNAI 3 and DNAI 5 |

Manner 3: DNAIs corresponding to DCs between which a packet transmission distance is less than or equal to the preset threshold form the resource group.

It should be noted that a DC may correspond to global positioning system (GPS) information or service area information of the DC. A packet transmission distance between two DCs may be calculated based on GPS information or service area information of the two DCs and with reference to a transmission networking status.

The preset threshold may be determined based on an actual deployment status of an edge APP, an actual network running status of an edge APP, or the like.

For example, if there are four DCs: a DC 1, a DC 2, a DC 3, and a DC 4, a packet transmission distance between the DC 1 and the DC 2 is less than the preset threshold, and a packet transmission distance between the DC 3 and the DC 4 is less than the preset threshold, packet transmission distances between the DC 1 and the DC 3, between the DC 1 and the DC 4, between the DC 2 and the DC3, and between the DC 2 and the DC 4 each are greater than the preset threshold. If DNAIs corresponding to the four DCs are a DNAI 1, a DNAI 2, a DNAI 3, and a DNAI 4. For a resource group constructed based on the DNAIs, refer to Table 4.

TABLE 4

| Resource group | DNAIs in the resource group |
|---|---|
| 1 | DNAI 1 and DNAI 2 |
| 2 | DNAI 3 and DNAI 4 |

By using the resource group constructed in the foregoing manner, DNAIs that represent relatively close deployment locations can form the resource group, so that a determined second edge APP can quickly process the service request sent by the terminal device and provide a corresponding service.

According to the method provided in this embodiment of this application, when the first edge APP is unavailable and the second edge APP is available, when receiving the service request for the service related to the first edge APP, the first network device redirects the service request to the second edge APP. Because the second edge APP and the first edge APP have the same service provider and the same function, a center APP does not need to process the service related to the first edge APP, so that pressure on the center APP can be reduced.

For some applications, for example, some applications that require an ultra-low latency, during construction of a resource group, a relatively strict latency requirement is imposed on a service. Therefore, a constraint on a neighboring relationship in a resource group is stricter. In the foregoing three manners, compared with the second DNAI determined by the first network device second DNAI based on the resource groups determined in the manner 2 and the manner 3, the second DNAI determined by the first network device second DNAI based on the resource group determined in the manner 1 can meet a requirement of a service with a lower latency.

Figure 7:
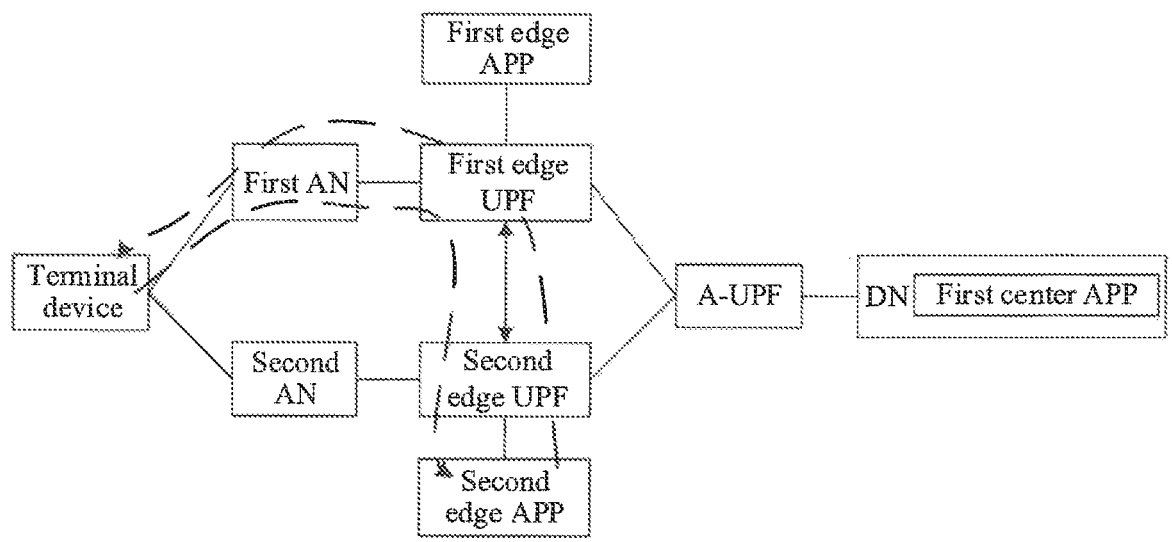
FIG. 7 is a schematic diagram of a service flow according to an embodiment of this application.

It should be noted that, because the first edge APP and the second edge APP are edge APPs connected to different edge UPFs, referring to FIG. 7, a path needs to be established between the edge UPFs corresponding to the first edge APP and the second edge APP, so that a service packet sent by the terminal device arrives at the second edge APP or a service packet sent by the second edge APP arrives at the terminal device.

Optionally, before step 502, the method may further include the following steps.

(11) The first network device sends instruction information to a second network device. The instruction information is used to instruct the second network device to establish a path between the first edge UPF corresponding to the first edge APP and a second edge UPF corresponding to the second edge APP.

The second network device may be an SMF. For example, a path may be a tunnel.

(12) The second network device receives the instruction information from the first network device.

(13) The second network device establishes, according to the instruction information, the path between the first edge UPF corresponding to the first edge APP and the second edge UPF corresponding to the second edge APP.

Optionally, after step 13 and before step 502, the method may further include the following steps.

(14) The second network device sends path update complete information to the first network device. The path update complete information is used to indicate that the path between the first edge UPF and the second edge UPF is established.

(15) The first network device receives the path update complete information from the second network device.

Optionally, the service request is a service request for a first service, and in a specific implementation, step 13 may include: sending, by the second network device, a first distribution rule to the first edge. UPF, where the first distribution rule is: sending, to the terminal device, a service packet that is of the first service of the terminal device and that is received from the second edge UPF, and sending, to the second edge UPF, the service packet that is of the first service and that is received from the terminal device; and sending, by the second network device, a second distribution rule to the second edge UPF, where the second distribution rule is: sending, to the second edge APP, the service packet that is of the first service of the terminal device and that is received from the first edge UPF, and sending, to the first edge UPF, the service packet that is of the first service of the terminal device and that is received from the second edge APP.

It should be noted that before step 502, the first network device further needs to obtain all or some DNAIs in a target resource group, to determine the second DNAI, and further determine the second edge APP. The target resource group is a resource group including the first DNAI.

Optionally, the method may further include:

(21) The first network device sends a location request to a third network device. The location request is used to request an edge UPF accessed by the terminal device.

The third network device may be an NEF.

(22) The third network device receives the location request from the first network device, and sends the location request to the second network device.

(23) The second network device receives the location request from the third network device, and obtains a target edge UPF based on the location request. The target edge UPF is the edge UPF accessed by the terminal device. In this embodiment, the target edge UPF is the first edge UPF.

(24) The second network device sends the target edge UPF to the third network device.

(25) The third network device receives the target edge UPF from the second network device, and obtains the target resource group based on the target edge UPF.

(26) The third network device sends all or some DNAIs in the target resource group to the first network device.

(27) The first network device receives all or some DNAIs in the target resource group from the third network device, and determines the second DNAI based on all or some DNAIs in the target resource group.

(28) The first network device determines the second edge APP based on the second DNAI.

Before step (25), the method may further include: receiving, by the third network device, at least one resource group from a mobile edge platform (MEP) manager. The resource group may be constructed by the MEP manager.

Optionally, in a specific implementation of this embodiment of this application, it may be determined, in either of the following two manners, that the first edge APP is unavailable.

Manner 1: The first network device determines that the first edge APP is unavailable.

The first edge APP may report to the first network device when the first edge APP is unavailable. The first network device determines, based on information reported by the first edge APP, that the first edge APP is unavailable. In this case, because the first network device can sense that the first edge APP is unavailable, the third network device may send all DNAIs in the target resource group to the first network device, and the first network device selects a DNAI other than the first DNAI as the second DNAI.

Manner 2: The third network device determines that the first edge APP is unavailable.

The MEP manager may monitor a status of the first edge APP. When the first edge APP is unavailable, the MEP manager report information that the first edge APP is unavailable to the third network device. In this case, because the first network device cannot sense the status of the first edge APP, the third network device may send some DNAIs in the target resource group to the first network device, the some DNAIs do not include the first DNAI, and the first network device selects a DNAI in the some DNAIs as the second DNAI.

It should be noted that a media access control (MAC) node corresponds to an MEP, the MEP is configured to manage the MEC node, and the MEP manager may manage a plurality of MEPs.

Figure 8:
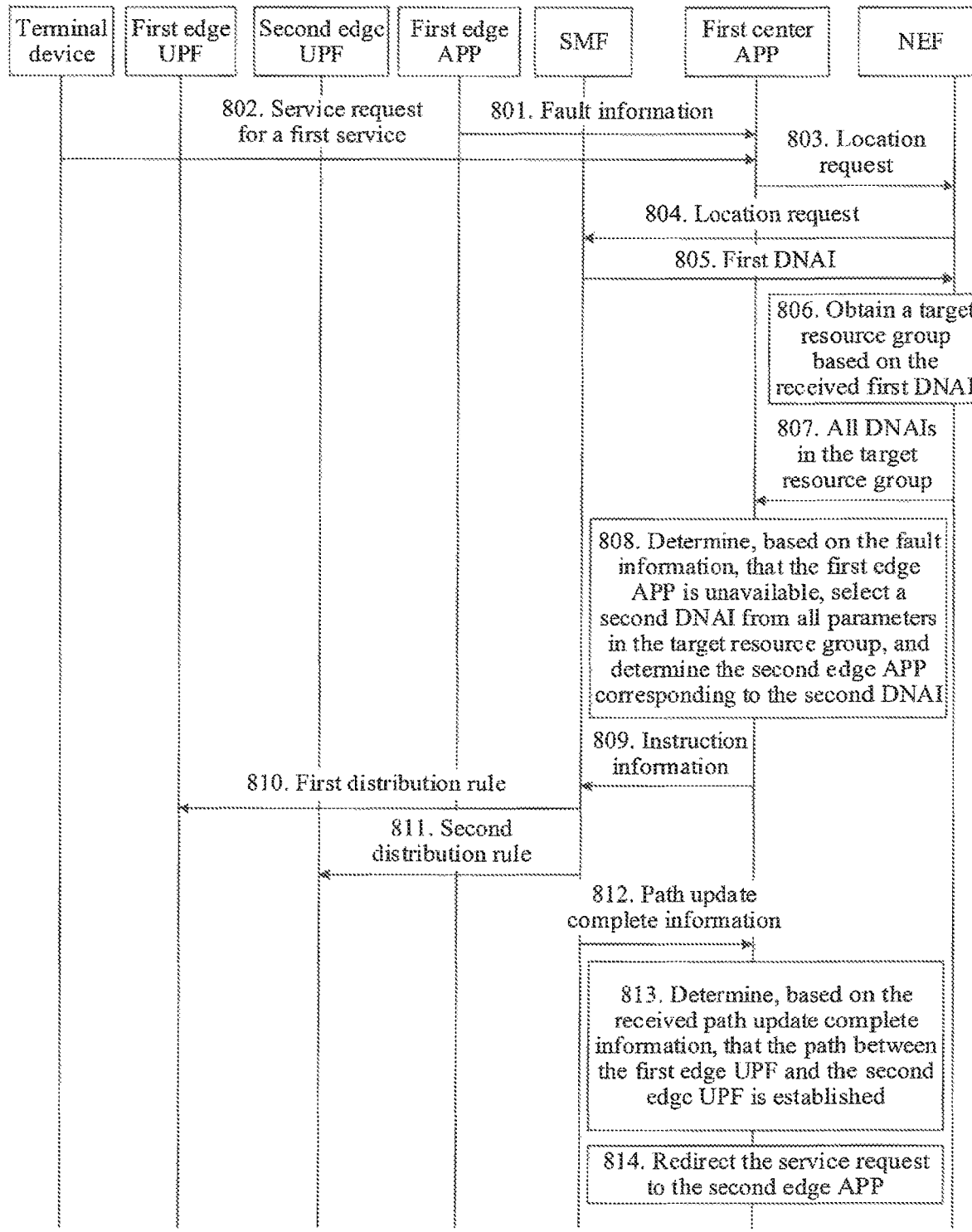
FIG. 8 is an interaction flowchart of a service redirection method according to an embodiment of this application.
Figure 9:
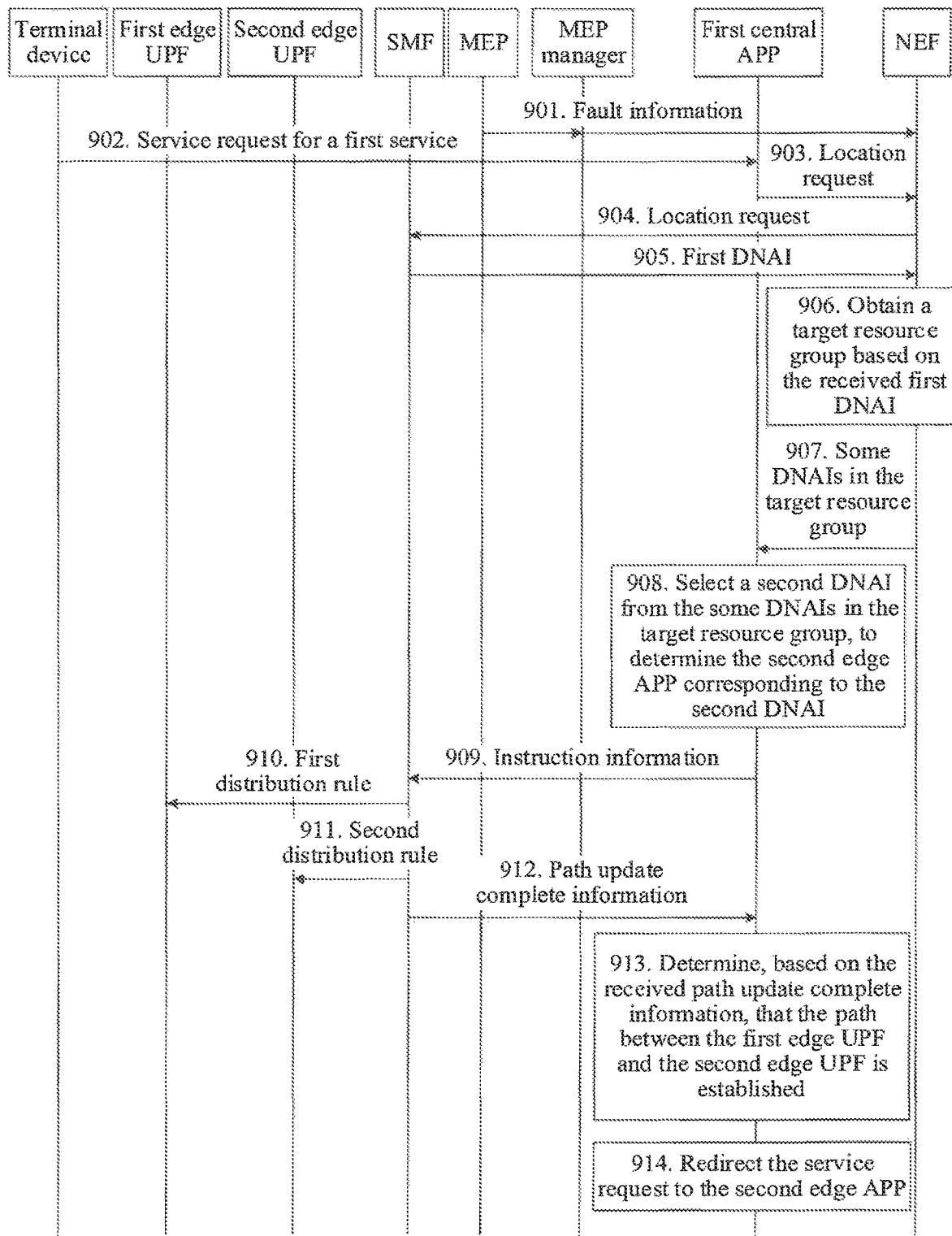
FIG. 9 is an interaction flowchart of a service redirection method according to an embodiment of this application.

FIG. 8 and FIG. 9 each show a service redirection method, and are used as an example for describing the method provided in the foregoing embodiment.

Referring to FIG. 8, the method may include the following steps.

801. A first edge APP reports fault information to a first center APP.

Specifically, when an edge APP is faulty, the edge APP may report fault information to a center APP, and the center APP may determine a specific faulty edge APP based on the fault information.

802. A terminal device sends a service request for a first service to the first center APP.

The first service is a service related to the first edge APP.

803. After receiving the service request, the first center APP sends a location request to an NEF.

The location request is used to request an edge UPF accessed by the terminal device. In this embodiment, an example in which the edge UPF accessed by the terminal device is a first edge UPF is used for description.

804. The NEF sends the received location request to an SMF.

805. The SMF returns a first DNAI to the NEF based on the received location request.

In an implementation of step 805, the SMF may determine the first DNAI based on the first edge UPF accessed by the terminal device. The first DNAI is associated with the first edge APP and the first edge UPF.

806. The NEF obtains a target resource group based on the received first DNAI.

Specifically, when a resource group is determined in the manner 1, the NEF may obtain the resource group using the first DNAI as a reference point, and the resource group using the first DNAI as the reference point includes the first DNAI. When the resource group is determined in the manner 2 or the manner 3, the NEF may obtain the resource group including the first DNAI.

807. The NEF sends all DNAIs in the target resource group to the first center APP.

For example, if the target resource group includes the first DNAI, a second DNAI, a third DNAI, and a fourth DNAI, the NEF sends the first DNAI, the second DNAI, the third DNAI, and the fourth DNAI to the first center APP.

Because the NEF cannot sense whether the first edge APP is faulty, the NEF may send all DNAIs hi the target resource group to the first center APP, and the first center APP determines that the first edge APP is faulty. If the NEF can sense that the first edge APP is faulty the NEF may also send another DNAI in the target resource group other than the first DNAI to the first center APP. Specifically, the NEF may determine, by exchanging information with the first center APP, that the first edge APP is faulty.

808. The first center APP determines, based on the fault information, that the first edge APP unavailable, selects the second DNAI from all DNAIs in the target resource group, and determines a second edge APP corresponding to the second DNAI.

809. The first center APP sends instruction information to the SMF.

The instruction information is used to instruct the SMF to establish a path between the first edge UPF corresponding to the first edge APP and a second edge UPF corresponding to the second edge APP.

810. The SMF sends a first distribution rule to the first edge UPF according to the instruction information.

The first distribution rule is: sending, to the terminal device, a service packet that is of the first service of the terminal device and that is received from the second edge UPF, and sending, to the second edge UPF, the service packet that is of the first service and that is received from the terminal device.

811. The SMF sends a second distribution rule to the second edge UPF according to the instruction information.

The second distribution rule is: sending, to the second edge APP, the service packet that is of the first service of the terminal device and that is received from the first edge UPF, and sending, to the first edge UPF, the service packet that is of the first service of the terminal device and that is received from the second edge APP.

812. The SMF sends path update complete information to the first center APP.

The path update complete information is used to indicate that the path between the first edge UPF and the second edge UPF is established.

813. The first center APP determines, based on the received path update complete information, that the path between the first edge UPF and the second edge UPF is established.

814. The first center APP redirects the service request to the second edge APP.

Referring to FIG. 9, the method includes the following steps.

901. An MEP monitors a status of a first edge APP, and if the status is abnormal, the MEP reports fault information to an NEF by using an MEP manager.

902. A terminal device sends a service request for a first service to a first center APP.

The first service may be a service related to the first edge APP.

903. After receiving the service request, the first center APP sends a location request to the NEF.

904. The NEF sends the received location request to an SMF.

905. The SMF returns, to the NEF based on the received location request, a first DNAI corresponding to the first edge APP.

906. The NEF obtains a target resource group based on the received first DNAI.

907. The NEF sends some DNAIs in the target resource group to the first center APP based on the fault information.

The some DNAIs do not include the first DNAI. For example, if the target resource group includes the first DNAI, a second DNAI, a third DNAI, and a fourth DNAI, the NEF sends the second DNAI, the third DNAI, and the fourth DNAI to the first center APP.

Because the NEF may sense whether the first edge APP is faulty, the NEF may send another DNAI in the target resource group other than the first DNAI to the first center APP. If the first center APP may sense whether the first edge APP is faulty, the NEF may also send all DNAIs in the target resource group to the first center APP, and the first center APP determines that the first edge APP is faulty. Specifically, the first center APP may determine, by exchanging information with the NEF, whether the first edge APP is faulty.

908. The first center APP selects the second DNAI from the some DNAIs in the target resource group, to determine a second edge APP corresponding to the second DNAI.

909. The first center APP sends instruction information to the SMF.

The instruction information is used to instruct a second network device to establish a path between a first edge UPF corresponding to the first edge APP and a second edge UPF corresponding to the second edge APP.

910. The SMF sends a first distribution rule to the first edge UPF according to the instruction information.

The first distribution rule is: sending, to the terminal device, a service packet that is of the first service of the terminal device and that is received from the second edge UPF, and sending, to the second edge UPF, the service packet that is of the first service and that is received from the terminal device.

911. The SMF sends a second distribution rule to the second edge UPF according to the instruction information.

The second distribution rule is: sending, to the second edge APP, the service packet that is of the first service of the terminal device and that is received from the first edge UPF, and sending, to the first edge UPF, the service packet that is of the first service of the terminal device and that is received from the second edge APP.

912. The SMF sends path update complete information to the first center APP.

The path update complete information is used to indicate that the path between the first edge UPF and the second edge UPF is established.

913. The first center APP determines, based on the received path update complete information, that the path between the first edge UPF and the second edge UPF is established.

914. The first center APP redirects the service request to the second edge APP.

Figure 10:
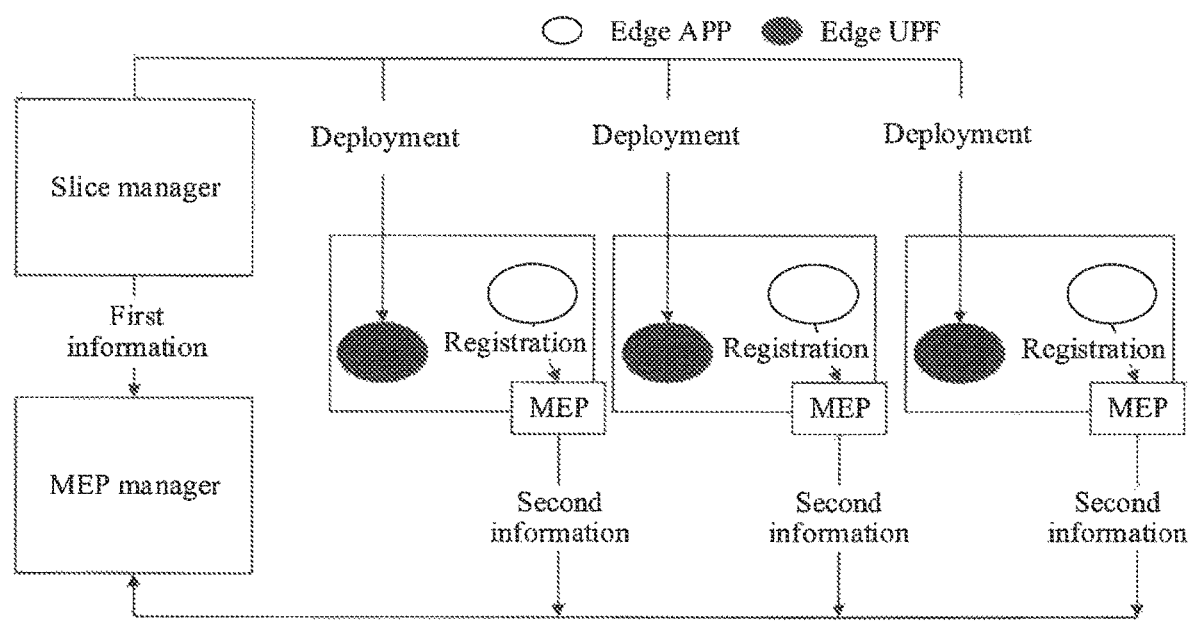
FIG. 10 is a schematic diagram of deploying an edge APP and an edge UPF according to an embodiment of this application.

Before performing the foregoing method, the MEP manager needs to construct a resource group and send the resource group to a third network device. Referring to FIG. 10, a slice manager can deploy an edge UPF. After deploying the edge UPF, the slice manager may send first information (for specific content, refer to the following) to the MEP manager. After instantiation of the edge APP is completed, the edge APP may register with the MEP. The MEP sends second information to the MEP manager (for specific content, refer to the following), and the MEP manager constructs the resource group based on the first information and the second information.

Figure 11:
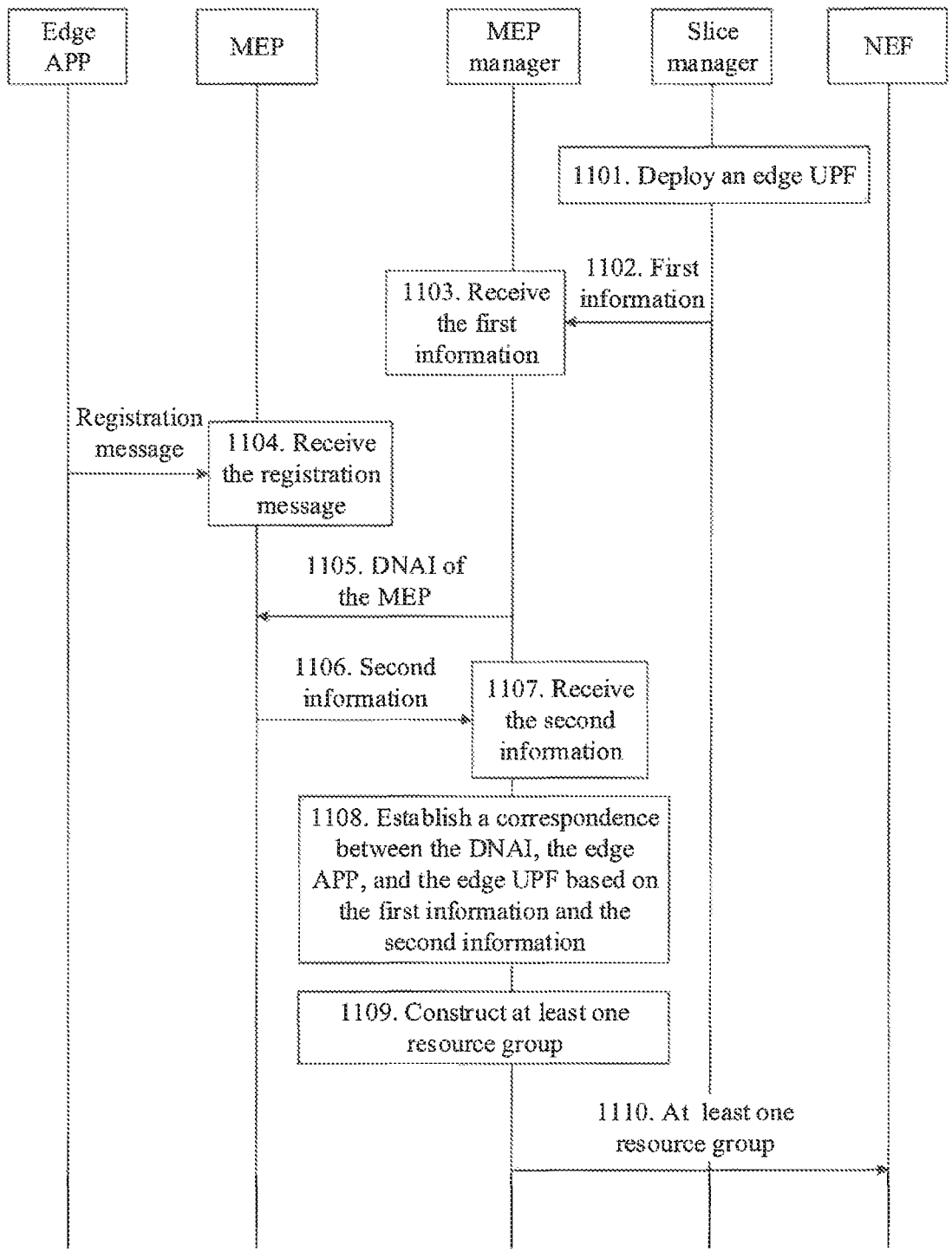
FIG. 11 is a schematic diagram of a method for constructing a resource group according to an embodiment of this application.

Referring to FIG. 11, a method for constructing a resource group may include the following steps.

1101. A slice manager deploys an edge UPF.

1102. The slice manager sends first information to an MEP manager.

The first information may be a correspondence between the edge UPF deployed by the slice manager and a DC.

Based on an example shown in Table 1, for the correspondence between the edge UPF and the DC, refer to Table 5.

TABLE 5

| DC | Edge UPF |
|---|---|
| DC 1 | Edge UPF 1 |
| DC 2 | Edge UPF 2 |

1103. The MEP manager receives the first information from the slice manager.

1104. The MEP receives a registration message sent by the edge APP.

The edge APP is deployed in the DC, and after being deployed, the edge APP may send the registration message to the MEP. A registration message sent by an edge APP may include a service identifier of the edge APP (application function-service-identifier), and may further include an internet protocol (IP) address of the edge APP.

1105. The MEP obtains a DNAI of the MEP from the MEP manager.

1106. The MEP associates the DNAI of the MEP with the edge APP registered with the MEP, and sends second information to the MEP manager.

The second message may include a correspondence between the edge APP and the DNAI of the MEP.

Based on the example shown in Table 1, if the MEP corresponds to a MEC 1, for information included in the second message, refer to Table 6. If the MEP corresponds to the MEC 2, for the information included in the second message, refer to Table 7.

TABLE 6

| DNAI | Edge APP |
| --- | --- |
| DNAI 1 | Edge APP 11 (company 1) |
| | Edge APP 12 (company 2) |
| | Edge APP 13 (company 3) |

TABLE 7

| DNAI | Edge APP |
| --- | --- |
| DNAI 2 | Edge APP 21 (company 1) |
| | Edge APP 22 (company 2) |
| | Edge APP 23 (company 3) |

1107. The MEP manager receives the second information from the MEP.

Specifically, the MEP manager may receive the second information from a plurality of MEPs.

1108. The MEP manager establishes a correspondence between the DNAI, the edge APP, and the edge UPF based on the first information and the second information.

After step 1108, for the correspondence between the DNAI, the edge APP, and the edge UPF, refer to Table 8.

TABLE 8

| DNAI | Edge UPF | Edge APP |
| --- | --- | --- |
| DNAI 1 | Edge UPF 1 | Edge APP 11 (company 1) |
| | | Edge APP 12 (company 2) |
| | | Edge APP 13 (company 3) |
| DNAI 2 | Edge UPF 2 | Edge APP 21 (company 1) |
| | | Edge APP 22 (company 2) |
| | | Edge APP 23 (company 3) |

The correspondence established by the MEP manager ay further include the DC.

It should be noted that a DC-related context may be preconfigured in the MEP manager. The DC-related context may include a DNAI associated with the DC, a TAI and a base station identifier (node id) of a service area corresponding to a UPF deployed in the DC, DC location (location) information, and the like. The DC location information may be GPS coordinate information of the DC. For example, for a DC-related context, refer to Table 9.

TABLE 9

| DC | DNAI | TAI | Base station identifier | DC location |
| --- | --- | --- | --- | --- |
| DC 1 | DNAI 1 | 1 | 1/2/3/4 | GPS coordinate 1 |
| DC 2 | DNAI 2 | 2 | 2/3/4/5 | GPS coordinate 2 |

The MEP manager may establish the correspondence between the DNAI, the edge APP, and the edge UPF based on the DC-related DNAI, the first information, and the second information.

1109. The MEP manager constructs at least one resource group.

For a method for constructing the resource group, refer to the foregoing description. Details are not described herein again.

1110. The MEP manager sends the at least one resource group to the NEF.

In the foregoing, embodiment, the edge APP may be a mobile edge application (mobile edge application), the edge UPF may be a mobile edge UPF, and an AN may be a RAN.

According to the methods provided in the embodiments of this application, resource sharing between MEC nodes is implemented. In a future high-performance computing capability scenario in which a graphics processing unit (GPU) is deployed, if a resource group is not constructed, areas may be insufficient or areas may be excessive. However, sharing of an edge capability is well implemented by constructing the resource group, in some abnormal scenarios, a better reliability mechanism is provided. When a local edge is unavailable, a nearest edge available resource can be used.

The foregoing mainly describes the solutions provided in the embodiments of this application from a perspective of the methods. It may be understood that, to implement the foregoing functions, the foregoing service redirection apparatus includes corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the service redirection apparatus based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in this embodiment of this application, module division is exemplary, and is merely a logical function division. In actual implementation, another division manner may be used.

Figure 12:
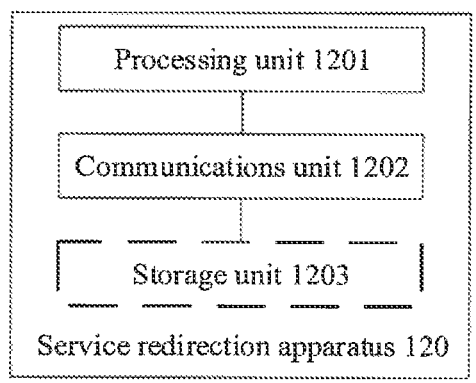
FIG. 12 is a schematic composition diagram of a service redirection apparatus according to an embodiment of this application.

When an integrated unit is used, FIG. 12 is a possible schematic structural diagram of a service redirection apparatus 120 in the foregoing embodiment. The service redirection apparatus 120 may be a first network device, a second network device, or a third network device. The service redirection apparatus 120 includes a processing unit 1201 and a communications unit 1202, and may further include a storage unit 1203.

When the service redirection apparatus 120 is the first network device, the processing unit 1201 is configured to control and manage an action of the first network device. For example, the processing unit 1201 is configured to support the first network device in performing the method shown in FIG. 5, processes 803, 808, 809, 813, and 814 in FIG. 8, processes 903, 908, 909, 913, and 914 in FIG. 9, and/or an action performed by the first network device in another process described in the embodiments of this application.

The communications unit 1202 is configured to support the first network device in communicating with another network entity, for example, communicating with the NEF or the SMF in FIG. 8. The storage unit 1203 is configured to store program code and data of the first network device.

When the service redirection apparatus 120 is a second network device, the processing unit 1201 is configured to control and manage an action of the second network device. For example, the processing unit 1201 is configured to support the second network device in performing processes 805, and 810 to 812 in FIG. 8, processes 905, and 910 to 912 in FIG. 9, and/or an action performed by the second network device in another process described in the embodiments of this application. The communications unit 1202 is configured to support the second network device in communicating with another network entity, for example, communicating with the first center APP or the NEF in FIG. 8. The storage unit 1203 is configured to store program code and data of the second network device.

When the service redirection apparatus 120 is the third network device, the processing unit 1201 is configured to control and manage an action of the third network device. For example, the processing unit 1201 is configured to support the third network device in performing processes 804, 806, and 807 in FIG. 8, processes 904, 906, and 907 in FIG. 9, and/or an action performed by the third network device in another process described in the embodiments of this application. The communications unit 1202 is configured to support the third network device in communicating with another network entity, for example, communicating with the first center APP or the SMF in FIG. 9. The storage unit 1203 is configured to store program code and data of the third network device.

The processing unit 1201 may be a processor or a controller. The communications unit 1202 may be a communications interface, a transceiver, a transceiver circuit, or the like. The communications interface is a general term, and may include one or more interfaces. The storage unit 1203 may be a memory. When the processing unit 1201 is the processor, the communications unit 1202 is the communications interface, and the storage unit 1203 is the memory, for the service redirection apparatus in this embodiment of this application, refer to the network device shown in FIG. 4. When the network device in FIG. 4 is the first network device, the processor 401 is configured to control and manage an action of the first network device. For example, the processor 401 is configured to support the first network device in performing the method shown in FIG. 5, processes 803, 808, 809, 813, and 814 in FIG. 8, processes 903, 908, 909, 913, and 914 in FIG. 9, and/or an action performed by the first network device in another process described in the embodiments of this application. When the network device in FIG. 4 is the second network device, the processor 401 is configured to control and manage an action of the second network device. For example, the processor 401 is configured to support the second network device in performing processes 805, and 810 to 812 in FIG. 8, processes 905, and 910 to 912 in FIG. 9, and/or an action performed by the second network device in another process described in the embodiments of this application. When the network device in FIG. 4 is the third network device, the processor 401 is configured to control and manage an action of the third network device. For example, the processor 401 is configured to support the third network device in performing processes 804, 806, and 807 in FIG. 8, processes 904, 906, and 907 in FIG. 9, and/or an action performed by the third network device in another process described in the embodiments of this application.

In an embodiment of this application, a computer-readable storage medium is further provided, including an instruction. When the instruction is run on a computer, the computer is enabled to perform the foregoing methods.

In an embodiment of this application, a computer program product including an instruction is further provided. When the computer program product is run on a computer, the computer is enabled to perform the foregoing methods.

All or some of the foregoing embodiments may be implemented by using software, hardware, firmware, or any combination thereof. When a software program is used to implement the embodiments, the embodiments may be implemented partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement a plurality of functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A service redirection method, comprising:
   receiving, by a first network device, a service request from a terminal device, wherein the service request is used to request a service related to a first edge application (APP); and
   when the first edge APP is unavailable and a second edge APP is available, redirecting, by the first network device, the service request to the second edge APP, wherein the first edge APP corresponds to a first data network access identifier (DNAI), the second edge APP corresponds to a second DNAI, the first DNAI represents a deployment location of the first edge APP, the second DNAI represents a deployment location of the second edge APP, the deployment locations represented by the first DNAI and the second DNAI meet a preset condition, and the second edge APP is in edge APPs corresponding to the second DNAI, and has a same service provider and a same function as the first edge APP.

2. The method according to claim 1, wherein the first DNAI and the second DNAI belong to a same resource group; and
   wherein
      base stations covered by access user plane functions (UPFs) corresponding to any two DNAIs in the resource group are neighboring base stations; or
      tracking area identities covered by access UPFs corresponding to any two DNAIs in the resource group are the same or adjacent; or
      a packet transmission distance between data centers (DCs) corresponding to any two DNAIs in the resource group is less than or equal to a preset threshold.

3. The method according to claim 1, wherein before the redirecting, by the first network device, the service request to the second edge APP, the method further comprises:
   sending, by the first network device, instruction information to a second network device;
   receiving, by the second network device, the instruction information; and
   establishing, by the second network device according to the instruction information, a path between a first edge user plane function (UPF) corresponding to a first edge application APP and a second edge UPF corresponding to a second edge APP, wherein the second edge APP is a serving edge APP to which the first network device redirects the service request of a terminal device when the first edge APP is unavailable.

4. The method according to claim 3, wherein the method further comprises:
   sending, by the second network device, path update complete information to the second network device, wherein the path update complete information is used to indicate that the path between the first edge UPF and the second edge UPF is established; and
   receiving, by the first network device, the path update complete information.

5. The method according to claim 3, wherein the method further comprises:
   sending, by the first network device, a location request to a third network device, so that the third network device obtains an edge UPF accessed by the terminal device and further obtains a target resource group, wherein the target resource group is a resource group comprising the first DNAI;
   receiving, by the third network device, the location request, and sending all or some parameters in the target resource group to the first network device;
   receiving, by the first network device, the all or some parameters in the target resource group;
   determining, by the first network device, the second DNAI based on the all or some parameters in the target resource group; and
   determining, by the first network device, the second edge APP based on the second DNAI.

6. The method according to claim 5, wherein the method comprises:
   receiving, by the third network device, the edge UPF accessed by the terminal device; and
   obtaining, by the third network device, the target resource group based on the edge UPF accessed by the terminal device, wherein the target resource group comprises the first DNAI.

7. The method according, to claim 3, wherein the service request is a service request for a first service, and the establishing, by the second network device according to the instruction information, the path between the first edge UPF corresponding to the first edge APP and the second edge UPF corresponding to the second edge APP comprises:
   sending, by the second network device, a first distribution rule to the first edge UPF, wherein the first distribution rule is: sending, to the terminal device, a service packet that is of the first service of the terminal device and that is received from the second edge UPF, and sending, to the second edge UPF, the service packet that is of the first service and that is received from the terminal device; and
   sending, by the second network device, a second distribution rule to the second edge UPF, wherein the second distribution rule is: sending, to the second edge APP, the service packet that is of the first service of the terminal device and that is received from the first edge UPF, and sending, to the first edge UPF, the service packet that is of the first service of the terminal device and that is received from the second edge APP.

8. The method according to claim 1, wherein the method further comprises:
   determining, by the first network device, that the first edge APP is unavailable.

9. A system, comprising:
   a first network device; and
   a second network device;
   wherein:
      the first network device is configured to: receive a service request from a terminal device, wherein the service request is used to request a service related to a first edge application (APP), when the first edge APP is unavailable; send instruction information to the second network device;
      the second network device is configured to: receive the instruction information, and establish, according to the instruction information, a path between a first edge user plane function (UPF) corresponding to a first edge application APP and a second edge UPF corresponding to a second edge APP, wherein the second edge APP is a serving edge APP to which the first network device redirects the service request of the terminal device when the first edge APP is unavailable;

the first network device is further configured to; redirect the service request to the second edge APP, wherein the first edge APP corresponds to a first data network access identifier (DNAI), the second edge APP corresponds to a second DNAI, the first DNAI represents a deployment location of the first edge APP, the second DNAI represents a deployment location of the second edge APP, the deployment locations represented by the first DNAI and the second DNAI meet a preset condition, and the second edge APP is in edge APPs corresponding to the second DNAI, and has a same service provider and a same function as the first edge APP.

10. The system according to claim 9, wherein the first DNAI and the second DNAI belong to a same resource group; and
wherein:
base stations covered by access user plane functions (UPFs) corresponding to any two DNAIs in the resource group are neighboring base stations; or
tracking area identities covered by access UPFs corresponding to any two DNAIs in the resource group are the same or adjacent; or
a packet transmission distance between data centers (DCs) corresponding to any two DNAIs in the resource group is less than or equal to a preset threshold.

11. The system according to claim 9,
wherein the second network device is further configured to: send path update complete information to the second network device, wherein the path update complete information is used to indicate that the path between the first edge UPF and the second edge UPF is established; and
the first network device is further configured to: receive the path update complete information.

12. The system according to claim 9, further comprises a third network device,
wherein the first network device is further configured to: send a location request to the third network device;
wherein the third network device is configured to: receive the location request, obtain an edge UPF accessed by the terminal device and a target resource group, wherein the target resource group is a resource group comprising the first DNAI; send all or some parameters in the target resource group to the first network device;
wherein the first network device is further configured to: receive the all or some parameters in the target resource group; determine the second DNAI based on the all or some parameters in the target resource group; and determine the second edge APP based on the second DNAI.

13. The system according to claim 9, wherein the service request is a service request for a first service,
wherein the second network device is configured to: send a first distribution rule to the first edge UPF, wherein the first distribution rule is: sending, to the terminal device, a service packet that is of the first service of the terminal device and that is received from the second edge UPF, and send, to the second edge UPF, the service packet that is of the first service and that is received from the terminal device; and send a second distribution rule to the second edge UPF, wherein the second distribution rule is the rule: to send, to the second edge APP, the service packet that is of the first service of the terminal device and that is received from the first edge UPF, and send, to the first edge UPF, the service packet that is of the first service of the terminal device and that is received from the second edge APP.

14. The system according to claim 9, wherein the first network device is further configured to: determine that the first edge APP is unavailable.

15. An apparatus, comprising:
at least one processor, and a memory storing computer-executable instructions;
wherein the computer-executable instructions, when executed by the at least one processor, cause the service redirection apparatus to:
receive a service request from a terminal device, wherein the service request is used to request a service related to a first edge application (APP); and
when the first edge APP is unavailable and a second edge APP is available, redirect the service request to the second edge APP, wherein the first edge APP corresponds to a first data network access identifier (DNAI), the second edge APP corresponds to a second DNAI, the first DNAI represents a deployment location of the first edge APP, the second DNAI represents a deployment location of the second edge APP, the deployment locations represented by the first DNAI and the second DNAI meet a preset condition, and the second edge APP is in edge APPs corresponding to the second DNAI, and has a same service provider and a same function as the first edge APP.

16. The service redirection apparatus according to claim 15, wherein the first DNAI and the second DNAI belong to a same resource group; and
wherein
base stations covered by access user plane functions (UPFs) corresponding to any two DNAIs in the resource group are neighboring base stations; or
tracking area identities covered by access UPFs corresponding to any two DNAIs in the resource group are the same or adjacent; or
a packet transmission distance between data centers (DCs) corresponding to any two DNAIs in the resource group is less than or equal to a preset threshold.

17. The service redirection apparatus according to claim 15, wherein the computer-executable instructions instruct the service redirection apparatus to:
send instruction information to a second network device, wherein the instruction information is used to instruct the second network device to establish a path between a first edge UPF corresponding to the first edge APP and a second edge UPF corresponding to the second edge APP.

18. The service redirection apparatus according to claim 17, wherein the computer-executable instructions instruct the service redirection apparatus to:
receive path update complete information from the second network device, wherein the path update complete information is used to indicate that the path between the first edge UPF and the second edge UPF is established.

19. The service redirection apparatus according to claim 17, wherein the computer-executable instructions instruct the service redirection apparatus to:
send a location request to a third network device, so that the third network device obtains an edge UPF accessed by the terminal device and further obtains a target resource group, wherein the target resource group is a resource group comprising the first DNAI;

receive all or some parameters in the target resource group from the third network device;

determine the second DNAI based on the all or some parameters in the target resource group; and determine the second edge APP based on the second DNAI.

\* \* \* \* \*

UNITED STATES PATENT AND TRADEMARK OFFICE
CERTIFICATE OF CORRECTION

PATENT NO. : 11,228,950 B2
APPLICATION NO. : 16/817023
DATED : January 18, 2022
INVENTOR(S) : Zhimin Shen Page 1 of 1

It is certified that error appears in the above-identified patent and that said Letters Patent is hereby corrected as shown below:

On the Title Page

Column 1 Please insert the foreign application priority data shown below:
--Foreign Application Priority Data
September 21, 2017 (CN).............201710860147.1--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*